United States Patent Office 2,970,125
Patented Jan. 31, 1961

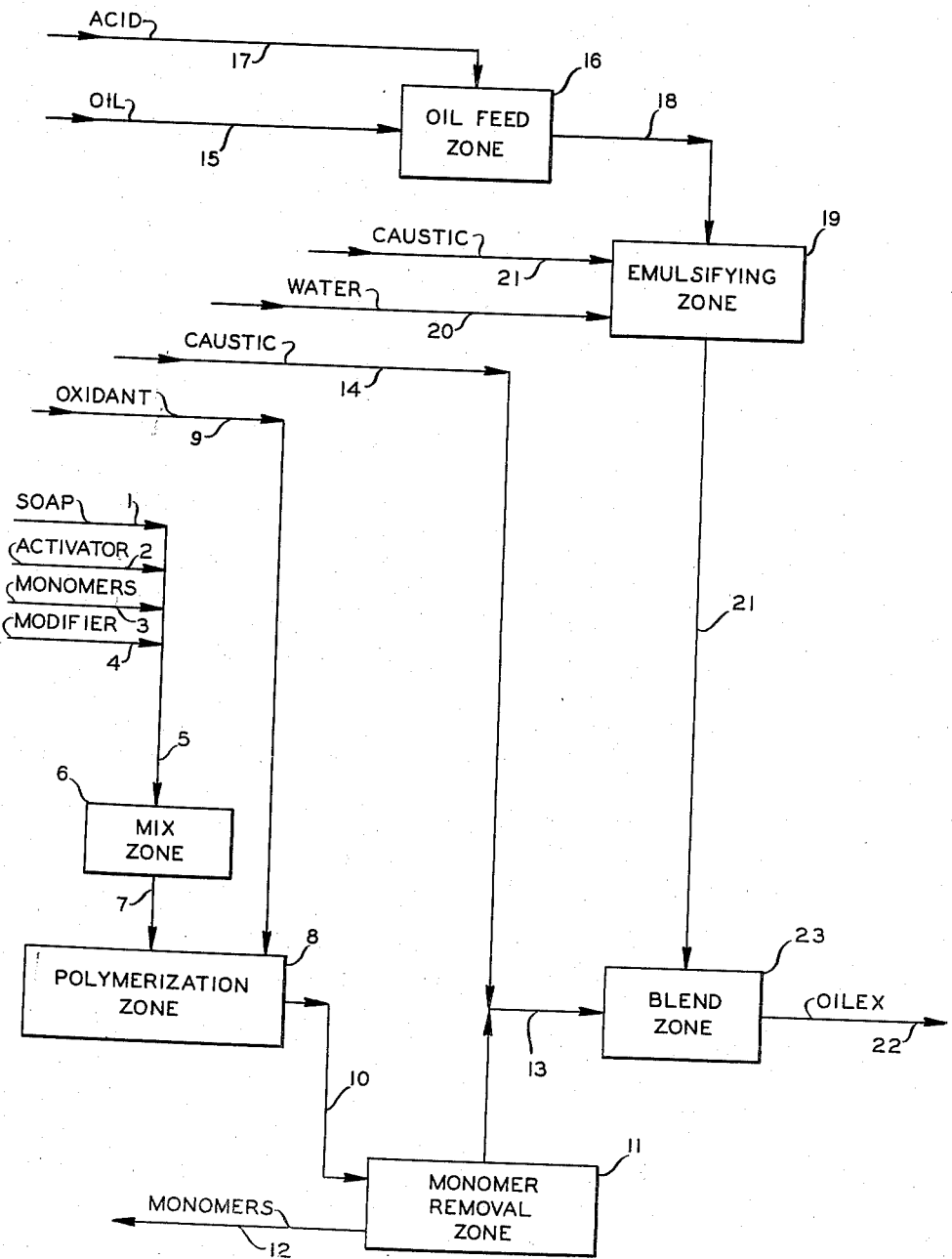

2,970,125
METHOD OF PREPARING A STABLE OIL EXTENDED LATEX

Bobbie H. Smith and Thomas J. Kennedy, Borger, Tex., assignors to Phillips Petroleum Company, a corporation of Delaware Filed Aug. 9, 1956, Ser. No. 602,990

9 Claims. (Cl. 260—23.7)

This invention relates to oil extended rubbers. In one of its aspects, this invention relates to a method of preparing a stable latex-oil emulsion.

The polymerization of monomeric material in aqueous emulsion is well known in the art. There are many activator recipes known to the art for preparing such latices. It is also known to use oil for extending rubbers by blending an oil emulsion with a latex. Such oil emulsions are especially useful in conjunction with those latices prepared from a recipe which would normally produce a rubber having a relatively high ML-4 Mooney value. While such methods are well known to the art, certain difficulties have been encountered in preparing rubbers by such blends of oil emulsion and latex. When using the prior art blending methods, a part of the oil would separate from the blend and rise to the top of the latex after balling up and thereby fouling the tank, thus requiring frequent cleaning. Also, the separated oil often segregates in the coagulated rubber which is undesirable for further processing.

By our invention, oil-latex blends are produced which are stable and separation of the oil is prevented.

An object of this invention is to provide a method for producing stable oil-latex emulsions.

Other objects, advantages and features of this invention will be obvious to those skilled in the art having been given this disclosure.

According to this invention, the oil-emulsion is prepared in the oil by partially neutralizing a soap forming acid, emulsifying the oil with the soap so formed and blending this emulsion with a latex having an excess amount of caustic in an amount sufficient to complete the neutralization.

We have found that when an oil emulsion having an excess of acid is blended with a latex having an excess of caustic, the resulting latex-oil blend is stable as contrasted to the blending of an oil emulsion having all the acid neutralized with a latex. This is true even though the total ingredients are the same. While we can offer no explanation for the improvement, we have found that by the prior art method of completely neutralizing the acid in the oil and blending with latex, the blending tank required cleaning about every 8 hours whereas, surprisingly, when the acid is only partially neutralized in the oil with the remaining caustic being added to the latex and then blending, we can operate for about a month without cleaning the blending tank. This economic advantage is obtained in addition to the surprising result that the blend was stable and oil did not segregate prior to coagulation, thus resulting in a more uniform rubber crumb.

Polymerization recipes for forming latices of rubbery polymers are well known in the art and any such recipe can be used. Examples of the more commonly used recipes include the iron pyrophosphate, diazothioether, polyalkylene polyamine and the sulfoxylate recipes, all known to the art.

In effecting such emulsion polymerization of monomeric material, particularly when a batch-type or semi-batch type operation is carried out, the reactor is usually first charged with the aqueous medium, which contains the desired emulsifying agent, and the monomeric material is then added while agitating the contents. At the same time, a reaction modifier, such as a mercaptan, is also included, usually in solution in at least a part of the monomeric material. An activator solution and an oxidant are separately added to the reaction mixture, and then the polymerization proceeds. The activator solution may be, and usually is, incorporated in the aqueous medium prior to the addition of the monomeric material, and then the oxidant is added as the last ingredient. Sometimes, however, satisfactory polymerization results can be obtained when the oxidant is incorporated prior to addition of the activator which is added as the last ingredient. It is also sometimes the practice to add portions of one or the other of the activator solution and oxidant intermittently or continuously, during the reaction. If the reaction is carried out continuously, streams of the various ingredients are admixed in somewhat the same order as they were in the hereinabove described batch process prior to their final introduction into the polymerization zone.

In the latex masterbatching of oil-type extenders, an emulsion of the oil (prepared by dissolving an emulsifier acid, usually oleic acid or tall oil, in the oil and adding this solution to a dilute aqueous caustic solution to neutralize the acid forming the emulsifier in situ) is mixed with the latex and this mixture is flocculated with an acid to form rubber particles known as rubber crumb. The crumb is then dried and used in the same manner as unextended rubber.

The oil used for rubber extension is a petroleum oil, usually a highly aromatic fraction. The selection of the particular oil and the amount to be used will be dependent upon the nature of the rubber. For example, those copolymers containing acrylonitrile are oil resistant and will not take as much oil as will some other type polymers such as a copolymer of butadiene and styrene. It is within the skill of the art to determine the type of oil and amount to be used. Our invention is directed to a method of preparing such blends as are known to the art.

Our invention is applicable to preparing oil-extended latices of rubbery polymers. These polymers can be homopolymers or copolymers of conjugated dienes or copolymers of same with other copolymerizable monomers. In general, if the polymer is to have rubber characteristics, i.e., to be classified as a synthetic rubber, then the amount of conjugated diene in the recipe will generally equal at least 50 weight percent conjugated diene. However, our invention is not limited to any ratio of monomer in the recipe, the only requirement being that the latex be compatible with the oil emulsion. That is, if one should desire to oil extend a latex of resinous polymer, the method of this invention would be operable. However, these oil extended polymers are usually synthetic rubbers.

As has been indicated, the emulsifier acid is usually oleic acid or tall oil. However, other fatty and rosin acids can be used. Examples of suitable fatty acids include caprylic, capric, lauric, myristic, palmitic, stearic, oleic, linolic, linolenic, etc. The rosin acid most frequently used is abietic acid or a dispropioniate rosin acid. Examples of other suitable rosin acids include dehydroabiatic, dihydroabietic, tetrahydroabietic, levopimaric, etc. These acids are saponified by use of an alkali, particularly sodium or potassium hydroxide with sodium hydroxide being generally preferred. As will be obvious to those skilled in the art, the soap is formed by the reaction between a strong base and a weak acid and for that reason, the pH of the emulsion will be greater than 7 even when only sufficient alkali is used to stoichiometrically react with the acid. In general, when using a sodium hydroxide, a pH of about 11 of the emulsion would contain sufficient caustic to react with all of the acid. We can use an oil in water emulsion of a pH in the range of 8.4 to 9.5. The pH of the latex can be in the range of 11.0 to 11.5. In any case, sufficient caustic should be in the latex to neutralize the acid in the oil emulsion.

In general, the amount of oil per 100 parts of rubber will be dependent upon the nature of the copolymer and can vary from 5 to 1000 parts oil per 100 parts rubber by weight but will most generally be in the range of 22.5 to 39.5 parts oil per 100 parts rubber by weight. The table below shows the preferred ranges for this invention.

TABLE I

| | Range |
|---|---|
| Oil-water emulsion: | |
| Parts water by weight | 64–58 |
| Parts oil by weight | 35–40 |
| Parts acid by weight | 1–1.3 |
| Parts caustic by weight | 0.032–0.125 |
| pH | 8.4–9.5 |
| Equivalent caustic/acid | .21/1–.67/1 |
| Latex: | |
| Parts polymer by weight | 16.0–21.5 |
| Parts water by weight | 84.0–78.5 |
| Parts caustic | 0.02–0.06 |
| pH | 11–11.5 |
| Latex-oil-water emulsion: | |
| pH | 9.5–10.5 |
| Parts of oil/100 parts rubber by weight | 22.5–39.5 |

As has been stated, the polymer useful in this invention can be homopolymers of conjugated dienes or copolymers of one or more conjugated dienes with a copolymerizable monomer. As those skilled in the art will understand, the conjugated diene most frequently used is 1,3-butadiene. However, other conjugated dienes can be employed. These conjugated dienes other than butadiene, which are generally preferred, are those which contain from four to eight, inclusive, carbon atoms per molecule and include isoprene (2-methyl-1,3-butadiene), piperylene, 2-methyl-1,3-pentadiene, 2,3-dimethyl-1,3-butadiene, chloroprene, and others. With a greater number of carbon atoms, the polymerization rate decreases somewhat, and there are so many isomers that it is not practical, with present procedures, to provide pure compounds. However, in a broader aspect of the invention, conjugated dienes having more than 8, such as twelve, carbon atoms per molecule can be used, particularly where the presence of various isomeric compounds can be tolerated. Furthermore, various alkoxy, such as methoxy and ethoxy, any cyano derivatives of these conjugated dienes, are also applicable. Thus, dienes, such as phenylbutadiene, 2,3-dimethyl-1,3-butadiene, 2-methoxy-3-ethyl-1,3-butadiene, 2-ethoxy-3-ethyl-1,3-hexadiene, 2-cyano-1,3-butadiene, and 2,3-diethyl-1,3-octadiene are applicable.

The copolymerizable monomers are well known in the art and include those containing an active $CH_2=C<$ group such as aryl olefins, heterocyclic nitrogen monomers, esters of acrylic and substituted acrylic acids, nitriles, amides, ketones, ethers, and halides. Specific examples of such copolymerizable monomers include styrene, alpha-methyl styrene, various alkyl and substituted alkyl styrenes, vinyl pyridine, various alkyl and substituted alkyl vinyl pyridines, vinyl and alpha-methyl vinyl quinolines, 3-phenyl-3-butene-1-ol, p-chlorostyrene, p-methoxystyrene, vinylnaphthalene, methyl acrylate, ethyl acrylate, methyl methacrylate, ethyl methacrylate, butyl methacrylate, methyl ethacrylate, acrylonitrile, methacrylonitrile, methacrylamide, methyl isopropenyl ketone, methylvinyl ketone, methyl vinyl ether, vinyl acetate, vinyl chloride, vinylidene chloride, vinyl furane, vinyl carbazole, vinyl acetylene and the like.

As has been previously said, the conjugated dienes will generally be used in an amount of at least 50 weight percent in the polymerization recipe.

This invention will be further described in conjunction with the drawing which is a block flow diagram of one embodiment for the practice of this invention.

Referring now to the drawing, soap or emulsifier from conduit 1, activator from conduit 2, monomer from conduit 3 and modifier from conduit 4 are passed via conduit 5 to mix zone 6 wherein these ingredients are blended and emulsified. The resulting emulsion passes via conduit 7 to polymerization zone 8. At this same time, an oxidant is admitted to polymerization zone 8 via conduit 9. The latex formed in polymerization zone 8 passes via conduit 10 to monomer removal zone 11 wherein unpolymerized monomer are recovered and returned to the polymerization zone via conduit 12. The monomer free latex leaves zone 11 via conduit 12 wherein caustic is added via conduit 14 to raise the pH to the desired level. The resulting high pH latex is then admitted to blend zone 14.

At the same time the latex is being prepared, an oil emulsion is prepared by passing oil via conduit 15 to oil feed tank 16. An emulsifying acid is admitted to the oil feed zone 16 via conduit 17. The resulting admixture is then passed via conduit 18 to emulsifying zone 19. Also added to this zone is water via conduit 20 and caustic in amounts sufficient to completely neutralize the acid is emulsified with the soap formed by the reaction between the acid and caustic in zone 19. This emulsion then passes via conduit 21 to blending zone 14 where it is blended with the latex and the acid is completely neutralized by caustic in the latex. The latex oil emulsion is then sent to further processing steps (not shown) via conduit 22. The blend formed in zone 14 is stable and very little oil segregation takes place.

Example

Several runs were made using a tall oil and a highly aromatic oil to provide a 2.2 weight percent tall oil in aromatic oil mixture. A sodium hydroxide solution was added to this mixture and the material subjected to the action of a Waring blendor to produce a stable oil emulsion of the desired pH. A latex of an 85 butadiene-15 styrene copolymer prepared by a conventional iron pyrophosphate recipe (GR–S), having a pH of 9.4 was provided. Additional caustic was added as required. The latex and emulsion were blended using about 2 parts of oil per part of copolymer. The blend was tested by subjecting the blend to the action of an electric mixer for one minute. The results are tabulated below.

| | Mix A | Mix B | Mix C |
|---|---|---|---|
| pH latex | 9.4 | 9.4 | 11.5. |
| pH emulsion | 10.5 | 8.4 | 8.4. |
| Preflox | Excessively Heavy | Heavy | Very Little. |

From the above data, it can be seen that when the emulsion is substantially neutralized, the emulsion readily breaks down. Reducing the pH of the blend alone improves the stability of the blend. However, when the pH of the latex is raised sufficiently to complete the saponification (Mix C), the resulting latex is stable.

We claim:
1. In a process of preparing a blend of a synthetic rubber latex prepared by emulsion polymerization of monomers comprising at least 50 weight percent conjugated diene the remaining monomer being a copolymerizable compound having a polymerizable ethylenic unsaturation and a petroleum oil emulsion prepared with an emulsifying soap wherein the emulsifying soap of the oil emulsion is prepared in situ by saponification of an organic acid saponifiable with an alkali, the improvement comprising adding said acid to said oil, adding an alkali selected from the group consisting of sodium hydroxide and potassium hydroxide to the resulting oil acid mixture in an amount insufficient to saponify all of the acid, emulsifying the oil in water with the saponified acid, adding additional alkali of the aforesaid type to the rubber latex in an amount when added to the first the unsaponified alkali is at least equivalent to said acid and thereafter blending the latex and oil emulsion thereby saponifying the remaining acid.

2. A process for preparing a stable blend of a synthetic rubber latex prepared by emulsion polymerization of monomers comprising at least 50 weight percent conjugated diene the remaining monomer being a copolymerizable compound having a polymerizable ethylenic unsaturation with a petroleum oil which comprises adding water and an acid selected from the group consisting of fatty and rosin acids saponifiable with an alkali to said oil, adding an alkali selected from the group consisting of sodium hydroxide and potassium hydroxide to the oil in an amount to supply 0.21 to 0.67 equivalent alkali per equivalent acid thereby saponifying only a portion of said acid, emulsifying the oil in the water in the presence of the saponified acid, adding additional alkali of the aforesaid type to the rubber latex in amount at least equivalent to the unsaponified acid and thereafter blending the latex and oil emulsion.

3. A process for preparing a stable blend of a synthetic rubber latex prepared by polymerizing a conjugated diene of 4 to 12 carbon atoms with a petroleum oil which comprises emulsifying said oil in water by adding to said oil an acid selected from the group consisting of fatty and rosin acids, saponifiable with an alkali adding an alkali selected from the group consisting of potassium hydroxide and sodium hydroxide and water to said oil and acid in an amount to supply 0.21 to 0.67 equivalent said alkali per equivalent said acid, thereby saponifying only a portion of said acid, and blending the mixture to form an emulsion, adding additional alkali selected from the group consisting of potassium hydroxide and sodium hydroxide to said latex in an amount when added to first said alkali to be at least equivalent to said acid, and blending the oil emulsion and the latex in an amount to provide 5 to 1000 weight parts oil per 100 parts rubber.

4. A process for preparing an oil extended rubber which comprises emulsion polymerization of monomers comprising at least 50 weight percent conjugated diene of 4 to 8 carbon atoms, the remaining monomers being selected from the group consisting of aryl olefins, heterocyclic nitrogen monomers, esters of acrylic and substituted acrylic acids, acrylic and substituted acrylic nitriles and amides, vinyl ketones, vinyl ethers, vinyl halides, vinyl furanes, vinyl carbazoles, and vinyl acetylenes; emulsifying a petroleum oil in water by adding to said oil and water an emulsifying acid selected from the group consisting of fatty and rosin acids saponificable with an alkali; adding an alkali selected from the group consisting of sodium hydroxide and potassium hydroxide to the resulting oil mixture in an amount to provide 0.21 to 0.67 equivalent alkali per equivalent acid thereby saponifying a portion of said acid; agitating the oil and water in the presence of the resulting soap to emulsify same; adding additional alkali of the aforesaid type to the latex in an amount when added to the first said alkali will provide at least equivalent alkali and acid; blending the latex with the oil emulsion in a ratio to provide 5 to 1000 weight parts of said oil per 100 parts rubber and thereafter coagulating the polymer.

5. The process of claim 4 wherein the oil emulsion and latex are blended in a ratio to provide 28.5 to 39.5 weight parts oil per 100 parts rubber.

6. The process of claim 5 wherein the acid is tall oil.

7. The process of claim 6 wherein the latex is prepared by emulsion polymerization of butadiene-1,3 and styrene.

8. The process of claim 5 wherein the acid is oleic acid.

9. The process of claim 5 wherein the acid is rosin acid.

References Cited in the file of this patent

UNITED STATES PATENTS 2,680,140    Carter _____ June 1, 1954

FOREIGN PATENTS 152,872    Australia _____ Aug. 18, 1953

OTHER REFERENCES

Swart et al.: India Rubber World, pp. 309–12, vol. 124, June 1951.

Moilliet et al.: Surface Activity, pp. 180–1, E&FN Spon Ltd., London (1951).

Noble: Latex in Industry, pp. 223–226, 2nd ed, Palmerton Pub. Co. (1953).

Bovey et al.: Emulsion Polymerization, pp. 401–402, Interscience (1955).

Bennett: Concise Chemical & Tech. Dict., p. 187, Chem. Pub. Co., Inc. (1947).